United States Patent
Wachs et al.

(10) Patent No.: US 8,461,063 B2
(45) Date of Patent: Jun. 11, 2013

(54) PACKING MATERIAL FOR CORROSIBLE METALLIC OBJECTS

(75) Inventors: Tilo Wachs, Remagen-Bandorf (DE); Josef Leuders, Gronau-Epe (DE); Juergen Triebert, Grossenhain (DE)

(73) Assignee: Nordenia Deutschland Gronau GmbH, Gronau (DE)

( * ) Notice: Subject to any disclaimer, the term of this patent is extended or adjusted under 35 U.S.C. 154(b) by 457 days.

(21) Appl. No.: 12/582,179

(22) Filed: Oct. 20, 2009

(65) Prior Publication Data

US 2010/0119788 A1 May 13, 2010

(30) Foreign Application Priority Data

Nov. 7, 2008 (DE) .......................... 10 2008 056 724
Dec. 10, 2008 (DE) .......................... 10 2008 061 253
Mar. 9, 2009 (DE) .......................... 10 2009 013 959

(51) Int. Cl.
*B32B 27/04* (2006.01)
*B32B 27/12* (2006.01)
*B32B 27/32* (2006.01)
*D04H 1/56* (2006.01)
*D04H 3/16* (2006.01)

(52) U.S. Cl.
USPC ........... 442/149; 442/394; 442/398; 442/400; 442/401

(58) Field of Classification Search
USPC ................. 442/149, 150, 151, 379, 394, 398, 442/400, 401
See application file for complete search history.

(56) References Cited

U.S. PATENT DOCUMENTS

| 3,410,717 | A | | 11/1968 | Hirsch .................... 428/355 BL |
| 4,818,588 | A | * | 4/1989 | Okabe et al. .................. 428/201 |
| 5,387,449 | A | * | 2/1995 | Kunz et al. ................... 428/35.4 |
| 5,705,566 | A | | 1/1998 | Todt ................................. 525/95 |
| 6,696,120 | B1 | * | 2/2004 | Todt ............................... 442/381 |
| 6,899,229 | B2 | * | 5/2005 | Dennison et al. ............. 206/583 |
| 7,229,512 | B2 | * | 6/2007 | Streicher ..................... 156/73.1 |
| 2002/0197925 | A1 | * | 12/2002 | Hamulski ..................... 442/286 |
| 2004/0063802 | A1 | * | 4/2004 | Lydzinski et al. ............ 521/134 |
| 2007/0138031 | A1 | * | 6/2007 | Miksic et al. ................ 252/194 |
| 2007/0160408 | A1 | * | 7/2007 | Peterson ...................... 400/621 |

FOREIGN PATENT DOCUMENTS

EP 0825019 A2 * 2/1998

OTHER PUBLICATIONS

Michael Szycher, "Szycher's Handbook of Polyurethanes" CRC Press, pp. 13-1 to 13-20 (1999).*

* cited by examiner

*Primary Examiner* — Elizabeth Cole
*Assistant Examiner* — Jeremy R Pierce
(74) *Attorney, Agent, or Firm* — Jonathan Myers; Andrew Wilford

(57) ABSTRACT

The invention relates to a packaging material for corrosible metallic objects, comprised of a plastic film forming a package outer surface, an inner layer, and an adhesive layer bonding the plastic film to the inner layer, wherein the adhesive layer comprises a volatile corrosion inhibitor and the inner layer has a high permeability for the corrosion inhibitor on the package outer surface as compared to the plastic film. According to the invention the adhesive layer is formed by a chemically binding reaction adhesive.

22 Claims, No Drawings

PACKING MATERIAL FOR CORROSIBLE METALLIC OBJECTS

The invention relates to a packaging material for corrosible metallic objects.

The packaging material is comprised of a plastic film forming a package outer surface, an inner layer, and an adhesive layer bonding the plastic film to the inner layer, wherein the adhesive layer comprises a volatile corrosion inhibitor and the inner layer has a high permeability for the corrosion inhibitor on the package outer surface as compared to the plastic film. The inner layer may be comprised of a textile layer, a perforated film, or a polymer film having a high permeability for the corrosion inhibitor. The volatile corrosion inhibitor, hereinafter referred as VCI (volatile corrosion inhibitor), is made up of compounds that in addition to corrosion protecting properties also have a vapor pressure. Due to the evaporation properties the corrosion inhibitor transitions into the gas phase and is deposited on the metal surface of the object to be protected as a film. The attraction of the VCI molecules is stronger than that of water molecules such that a protective layer is formed on the metal surface. The presence of the corrosion protection inhibitor having transitioned into the gas phase inhibits the electrochemical processes leading to corrosion. In this manner a temporary corrosion protection is created inside the packaging, whose effective period lasts several months. Volatile corrosion inhibitors that can be used are, for example, nitrite compounds or amine salts, such as dicyclohexyl amine benzoate and diethanol amine nitrite (GB 1 048 770) [U.S. Pat. No. 3,410,717]. After removing the VCI packaging, the VCI components escape without residue from the metal surface such that no subsequent cleaning of the metal objects is required before the further use thereof. This is a decisive advantage of a packaging containing VCI as opposed to other methods of temporary corrosion protection, such as the oiling/lubricating of components. In any case the latter require the removal of the corrosion protection oil/lubricant from the parts. This is commonly carried out using organic solvents or acidic or alkali degreasing solutions and represents additional process steps as well as a risk to health and the environment.

It is known to apply or incorporate solid or liquid VCI active agents or VCI active agent mixtures onto or into packaging materials, such as plastic films, papers, cardboard, foam materials, composite materials, and the like. For this purpose methods such as soaking, spraying, coating, or incorporating by extrusion and similar methods are used. The advantage of papers or cardboard containing VCI is the great absorbability of the active agents. Papers and cardboard can absorb a multiple of the amount of active agent that can be incorporated into plastic films. However, they release the active agents much quicker than the latter. This means that although paper and cardboard soaked in VCI enable a quicker and initially effective corrosion protection, they do not last long. Plastic films and other polymer carriers release their VCI active agents much slower. Therefore, they do not achieve such a quick corrosion protective effect as paper; however they usually have a significantly better long-term effect.

In industrial packaging processes both modes of operation are of significance. Packages for system parts or tools are usually transported within a few hours. This means they are possibly subjected to the environmental conditions existing in transport containers on trucks and boats without any lengthy conditioning times for the VCI components. In this case a quick corrosion protection of the parts is needed. With a long transport or storage period in turn, a long-lasting corrosion protection is necessary. In practice material combinations for the temporary corrosion protection are therefore often used. For example, VCI film re-packaging material in combination with inserted VCI papers or VCI foam materials are used. The simultaneous use of oiling/lubricating of the parts to be protected and of the VCI film re-packaging is common. However, both methods have disadvantages. The inserted papers may be soaked with penetrating water vapor and subsequently become permanent moisture dispenses on the metal parts, which causes corrosion. The combination of corrosion protective oils/lubrication and VCI re-packaging may lead to undefined conditions on the metal parts and even to the cancellation of the corrosion protection. The simultaneous use of different VCI packaging materials has another decisive disadvantage. The formation of hazardous substances, such as N-nitrosamines, may occur as a result of reactions of the different VCI components. The highly cancerous substances are formed during the simultaneous use of products containing nitrite and secondary amine.

A packaging material having the above described properties is known from EP 0825 019 [U.S. Pat. No. 5,705,566]. In order to glue the plastic film on the package outer side to a textile inner layer a hot-melt adhesive is used. The volatile corrosion inhibitor must be mixed with the adhesive in the molten state thereof. The mixture of hot-melt adhesive and corrosion inhibitor must further be re-heated during processing, e.g. for the production of the laminated bond. In both process steps a large part of the volatile VCI active agent is lost. Work protection measures are necessary since the substances suitable as volatile corrosion inhibitors are hazardous to health. Furthermore, the packaging materials have the above explained disadvantage of plastic films containing VCI, in that the corrosion protection is built up relatively slowly.

In this regard the invention is based on the object of providing a packaging material having a corrosion protection effect, which requires only the addition of small amounts of a corrosion inhibitor and which may be produced without having to provide any special precautions for work protection. With the use as packaging material for metal objects, the corrosion protection effect should be built up quickly and long-term protection should be ensured.

Based on a packaging material having the characteristics described above, the problem is solved according to the invention in that the adhesive layer is formed by a chemically setting reaction adhesive. Chemically setting reaction adhesives used in the course of the teachings according to the invention can be processed at temperature of up to about 80° C. Preferably, chemically setting reaction adhesives are used that may be processed at low temperatures, particularly at temperatures of up to 60° C. Particularly preferred chemically setting reaction adhesives are used that harden at room temperature or slightly increased temperature or may be processed at a temperature of up to 40° C. The corrosion inhibitor may be incorporated into the laminating adhesive just before the laminating process at the stated temperatures, wherein only small amounts of the volatile corrosion inhibitor are transitioned into the gas phase such that no particular work protection measures are required. It is of further advantage that only laminating rollers and adhesive basins are contaminated with the hazardous substances and the device parts can be cleaned easily after laminating.

According to a preferred embodiment the inner and outer surfaces of the adhesive layer are increased by a plurality of gas bubbles. For this purpose the adhesive comprises a plurality of smallest gas bubbles in the interior thereof, having an expansion in the micrometer to nanometer range. The gas bubbles may be created by a chemical reaction with gas formation during the hardening of the adhesive. Generally, however, the incorporation, uniform distribution, and optionally volume increase of smallest gas bubbles in the adhesive by physical methods, such as creating a low pressure, is also possible. The adding of gas or foam forming additive is also conceivable. The large surface of the adhesive foam causes a very quick and effective dispensing of part of the VCI effective substances. This leads to a quickly built up VCI corrosion protection of the packaged metal objects. Simultaneously, however, the hardened adhesive also has the long-lasting depot effect of VCI plastic films such that a sufficiently large amount of the VCI active agent is still released for the corrosion protection of the packaged metal components after a period of several days to weeks.

The effective surface of the adhesive layer for discharging the VCI active substances may also be increased in that a material is selected as the inner layer that partially penetrates into the adhesive layer. It is of particular advantage if the material of the inner layer penetrating into the adhesive layer is structured such that capillary forces become effective between the material of the inner layer and the adhesive layer. According to a preferred embodiment of the invention the inner layer is a textile layer, whose fibers partially penetrate into the surface of the adhesive layer, thus enlarging the surface of the adhesive layer. The boundary surface between the adhesive layer and the textile layer is not smooth and it may further be observed via REM/microscopic images that the adhesive is pulled upward due to capillary forces acting upon the individual fibers, which also contributes to an enlargement of the surface of the adhesive effective for the discharge of the VCI active substances.

Only small amounts of the corrosion inhibitor are needed for the corrosion protection effect of the packaging material. The plastic film forms an effective blocking layer and ensures that the effective substance is almost exclusively transitions into the space enclosed by a packaging. The adhesive bond is not adversely affected by the small proportion of the corrosion inhibitor in the adhesive layer.

A monocomponent reaction resin adhesive may be used as the reaction adhesive that polymerizes upon being exposed to air moisture. A solution-free PUR adhesive basically comprised of aliphatic or aromatic isocyanates is preferred. Due to the addition of water, which may be added to the adhesive mass together with the VCI effective substance, the reaction related to a gas formation and therefore also the proportion, the distribution and the size of the gas bubbles obtained in the hardened adhesive layer may be influenced. Based on the total weight of VCI active substance and water the water content is, for example, between 0.2 weight by % and 7 weight by %, preferably between 0.5 weight by % and 3 weight by % of water. Preferably, the reaction conditions are set such that the structure of the hardened adhesive equal to that of a foamed plastic material. For this purpose the hardened adhesive layer has a layer thickness that is two to five times the amount of the thickness of the applied unfoamed adhesive. Finally, a mixing of multiple VCI active substances is also possible in this case. Among others, compounds of primary, secondary, or tertiary amines or nitrite compounds are suitable as the VCI effective substances.

However, without departing from the scope of the invention it should not be excluded that reaction adhesives based on solutions and two-component reaction resin adhesives may also be used.

Preferably, the adhesive layer is applied at an application weight of 1 $g/m^2$ to 10 $g/m_2$ based on the surface of the packaging material, wherein an amount of 2 to 6 $g/m^2$ is preferred.

Preferably, the corrosion protection inhibitor is present in the adhesive layer at an amount of 0.1 $g/m^2$ to 5 $g/m^2$ based on the surface of the packaging material. Preferably, it is evenly mixed with the reaction adhesive. Based on the total weight of adhesive and VCI effective substance, the proportion of the VCI effective substance is preferably between 2 and 20 weight by %, particularly preferred between 2 and 10 weight by %.

The plastic film and the inner layer may be connected to each other in layers by a uniform application of the adhesive layer. However, without departing from the scope of the invention it is also conceivable that the adhesive layer forms a pattern of adhesive surfaces and adhesive-free surfaces and is present, for example, in punctiform, striped, grate-like, and the like shapes in the contact area between the plastic film and the textile layer.

The plastic film is comprised of a polymer that forms a barrier against migration of the corrosion inhibitor. The migration of the adhesive in the polymer depends on the solubility of the active agent in the polymer and on the diffusion speed. The migration is smaller than the migration of the effective substance in the adhesive layer by the factor 5, preferably by more than the factor 10. A plurality of conventional polymers is suitable for the plastic film. Preferably, the plastic film is comprised of polyolefin, particularly polyethylene, or a polyolefin copolymer. The plastic film may further be embodied with multiple layers and may comprise a blocking layer having a high diffusion resistance to the corrosion inhibitor, while one or more further layers impart desired processing or utilization properties, such as stretching properties, sealability, and the like, upon the film and the composite. In order to obtain a very high barrier effect, the plastic film may be vaporized with a thin metal coating. In addition to the vaporizing of one of the layers, the incorporation of a metal layer as the barrier may also be provided in a multi-layer embodiment. Regardless of whether the plastic film is embodied with one or multiple layers, it preferably has a thickness of between 10 µm and 120 µm. A thickness between 20 µm and 50 µm is particularly preferred.

A face of the plastic film turned toward the adhesive layer may have a surface structure modified by pretreatment, particularly Corona pretreatment, for improving the adhesive bond.

The inner layer is preferably a textile layer. It forms a permeable layer for the proportions of the corrosion inhibitor transitioned into the gas phase and ensures mechanical protection of the packaged goods. The textile layer preferably has a soft and/or fluffy surface. The textile layer is preferably comprised of a nonwoven material made from polymer fibers, wherein a spunbond fabric, a meltblown fabric, or a combination of spunbond fabric and meltblown fabric is suitable as the nonwoven material. The textile layer may further be comprise from a fabric, interlaced fabric, or knitted fabric. The packaging material according to the invention may be produced as rolled goods and further processed by commercially available laminating device. The packaging material may be used to produce pouches, bags, bonnets, and the like. If the plastic film and the textile material are produced from the same polymers, such as polyolefins, the packaging material can be recycled. Due to the low proportions of the corrosion inhibitor, recycling can be carried out without any problems. As an alternative, the inner layer may be formed by a foam material that preferably has an open-pore structure in order to enable a high permeability for the VCI active substance. An inner layer made from textile material or foam material also has the advantage that liquid accumulating on the inner layer, such as condensation water, may be absorbed to a certain degree. In this manner the formation of a permeable liquid film on the inner layer and a respectively increased tendency toward corrosion of the packaged object may be prevented.

The packaging material according to the invention is also suitable for packaging and for the protection of metal objects made from steel, stainless steel, aluminum, copper, brass, and the like, and may be used, for example, as packaging material for machined system parts, machines and apparatuses, vehicles, sheet metal and other parts for the steel industry. Due to the low proportions of the corrosion inhibitor machines for the food industry may also be packaged.

Repackaging made from the packaging material according to the invention ensures a quick build-up of complete corrosion protection of metal materials via the gas phase. Thus far, this has only been achieved by the use of VCI papers or cardboard. Furthermore, the packaging material according to the invention also enables a long-lasting, excellent corrosion protection effect, even with the formation of condensation water directly on the packaged metal surfaces, such as in case of long container transports overseas. The packaging material according to the invention therefore combines the advantages of VCI papers and VCI films alike without having the disadvantages thereof. Merely one single packaging material needs to be used for many different applications. Combinations of different VCI materials having the respective disadvantages stated above are no longer an issue.

The total thickness of the packaging material is typically between 70 and 20 µm, preferably between 80 and 150 µm.

SPECIFIC EXAMPLES

Example 1

The illustrated embodiment is based on a composite having a 38 µm thick polyethylene film and a nonwoven material having a mass per unit area of 17 g/m$^2$.

The polyethylene film is comprised of a mixture of PE-MD and PE-LD and may contain conventional additives, such as up to 10% in weight of titanium dioxide for white staining. The nonwoven material is comprised of a spunbond nonwoven material made from polypropylene.

The polyethylene film is extruded and pretreated on the laminating side using Corona discharges. A monocomponent, water hardening polyurethane adhesive basically comprised of aromatic polyisocyanate is used as the adhesive for the production of the laminating bond.

The commercially available product VCI 9000 (Grofit Plastics) is used as the corrosion inhibitor. A liquid is present having a boiling point of approximately 200° C. and having a vapor pressure of less than 0.01 hPa at room temperature (20° C.). The corrosion inhibitor is mixed with the liquid adhesive by incorporation. The mixture of adhesive and corrosion inhibitor contains about 10% in weight of the corrosion inhibitor. The mixture consisting of adhesive and corrosion inhibitor is applied to the film in surface contact at an application weight of about 2 g/m$^2$ before the nonwoven is attached and the composite is completed. In the illustrated embodiment the application amount of the corrosion inhibitor is therefore only 0.2 g/m$^2$. In this manner a sufficient corrosion protection effect is achieved.

Example 2

A composite made from a 38 µm thick polypropylene film and a 40 µm thick plastic nonwoven material having a modified adhesive containing VCI was glued for the temporary corrosion protection of non-alloy steel components. For gluing an air moisture hardening monocomponent polyurethane adhesive (1-K-PUR) was used, into which a VCI component had been incorporated.

The air moisture hardening monocomponent PUR adhesive was added at 4% by weight to a chemical compound of ethanol amine and a carbonic acid (carboxylate and amide) and thoroughly mixed directly before application onto the polypropylene film. The added chemical compound (VCI active substance) contained approximately 2% in weight of water. The water content lead to the formation of carbon dioxide ($CO_2$) in the adhesive directly after the application of the modified adhesive onto the plastic film. This resulted in the formation of smallest gas bubbles in the adhesive and to a slight foaming of the adhesive during and after gluing of the nonwoven material to the polypropylene film. The layer thickness of the applied adhesive layer was therefore increased from approximately 10 to 20 µm in the unfoamed fluid state to approximately 50 to 60 µm in the hardened state. Scanning electron microscopic images of the hardened adhesive layer shows a plurality of small and smallest bubbles in the micrometer to nanometer range. The structure of the hardened adhesive was morphologically equal to a foamed plastic material.

Film bags were produced from the composite material containing VCI produced in this manner by a laminating device. Plastic frames were inserted into them, into which in turn steel samples (sheet metal and cylinders) made from non-alloy corrosible steel were firmly inserted. Subsequently, the bags were tightly sealed.

The packages were loaded into climate chambers after a conditioning period of 5 to 20 hours. Cyclic changes between room temperature and 98% relative air moisture and 55° C. and 93% relative air moisture were applied. As opposed to the blind samples without any VCI active agents having been produced and loaded in the same manner, the packaging containing VCI showed no corrosion points on the steel samples, even after several days of loading. Even in the case of water condensation forced onto the steel surface from the beginning, it showed no corrosion, even after several days of loading, in contrast to strongly corroding blind samples having no VCI.

Sheet metals of the cold-rolled non-alloy steel DC 03, material number 1.0347 (Q-panels, Pausch Messtechnik GmbH, Haan) and polished cylindrical sample bodies made from the non-alloy deoxidized steel S235JRG2, material number 1.0038 (rod material, ThyssenKrupp Schulte GmbH, Radebeul) were used as the corrosible metal objects.

The invention claimed is:

1. A packaging material for corrosible metallic objects, comprised of a plastic film forming a package outer surface, an inner textile layer, and a hardened foamed adhesive layer bonding the plastic film to the inner textile layer, wherein the hardened foamed adhesive layer is a chemically set reaction adhesive which comprises a polyurethane, water, a volatile corrosion inhibitor and on a surface of the hardened foamed adhesive layer, a plurality of small gas bubbles consisting of carbon dioxide in the micrometer to nanometer range which are created by a chemical reaction with gas formation during the hardening of the foamed adhesive, and the inner textile layer contains fibers which partially penetrate through a surface of the hardened foam adhesive layer and which has a higher permeability for the corrosion inhibitor on the package outer surface as compared to the permeability for the corrosion inhibitor for the plastic film.

2. The packaging material according to claim 1 wherein the structure of the hardened foamed adhesive is a foamed plastic material.

3. The packaging material according to claim 2 wherein the foamed adhesive layer as a result of the gas formation has a layer thickness that is two to five times the thickness of the unfoamed adhesive applied.

4. The packaging material according to claim 3 wherein a monocomponent reaction resin adhesive is used as the reaction adhesive that polymerizes when exposed to air moisture.

5. The packaging material according to claim 1 wherein the reaction adhesive is a solvent-free polyurethane adhesive basically comprised of aliphatic or aromatic isocyanates.

6. The packaging material according to claim 1 wherein the reaction adhesive is a two-component reaction resin adhesive.

7. The packaging material according to claim 1 wherein the foamed adhesive layer features an application weight of 1 $g/m^2$ to 10 $g/m^2$.

8. The packaging material according to claim 1 wherein the corrosion inhibitor is present in the foamed adhesive layer at an amount of 0.1 $g/m^2$ to 5 $g/m^2$, based on the surface of the packaging material.

9. The packaging material according to claim 8 wherein the corrosion inhibitor is evenly distributed within the foamed adhesive layer.

10. The packaging material according to claim 1 wherein the plastic film and the inner textile layer are bonded to each other in surface contact by the uniformly distributed foamed adhesive layer.

11. The packaging material according to claim 1 wherein the foamed adhesive layer forms a pattern of adhesive surfaces or adhesive-free surfaces.

12. The packaging material according to claim 1 wherein the plastic film is comprised of a polymer forming a barrier against the migration of the corrosion inhibitor.

13. The packaging material according to claim 1 wherein the plastic film is comprised of a polyolefin or a polyolefin copolymer.

14. The packaging material according to claim 1 wherein the plastic film has multiple layers and has a blocking layer featuring a higher diffusion resistance for the corrosion inhibitor than the inner layer.

15. The packaging material according to claim 1 wherein the plastic film has a thickness of between 10 and 120 μm.

16. The packaging material according to claim 1 wherein a face of the plastic film turned toward the foamed adhesive layer has a modified surface structure for improving the adhesive bond.

17. The packaging material according to claim 1 wherein the inner textile layer is comprised of a nonwoven material from polymer fibers.

18. The packaging material according to claim 17 wherein the nonwoven material is a spunbond nonwoven material, a meltblown nonwoven material, or a combination of spunbond and meltblown nonwoven materials.

19. The packaging material according to claim 1 wherein the inner textile layer is comprised of a fabric, interlaced fabric, or knitted fabric.

20. The packaging material according to claim 1 wherein the total thickness is between 70 μm and 200 μm.

21. The packaging material according to claim 16 wherein a face of the plastic film turned toward the foamed adhesive layer has a Corona pretreatment modified surface structure.

22. The packaging material according to claim 14 wherein the blocking layer is formed by a metal coating.

* * * * *